US006976718B2

(12) United States Patent
Nakanishi

(10) Patent No.: US 6,976,718 B2
(45) Date of Patent: Dec. 20, 2005

(54) VEHICLE BUMPER DEVICE

(75) Inventor: Isamu Nakanishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/938,914

(22) Filed: Sep. 9, 2004

(65) Prior Publication Data

US 2005/0082851 A1 Apr. 21, 2005

(30) Foreign Application Priority Data

Oct. 16, 2003 (JP) .............................. 2003-356582

(51) Int. Cl.[7] .............................................. B60R 19/38
(52) U.S. Cl. ..................................... 293/118; 293/119
(58) Field of Search ................................ 293/118, 119

(56) References Cited

U.S. PATENT DOCUMENTS 4,514,002 A * 4/1985 McIntosh .................... 293/118
6,224,120 B1   5/2001 Eipper et al.
6,773,044 B2 * 8/2004 Schambre et al. .......... 293/118

FOREIGN PATENT DOCUMENTS

| FR | 2 528 928 | 12/1983 |
| JP | 5-22216 | 3/1993 |

* cited by examiner

Primary Examiner—Lori L. Coletta
(74) Attorney, Agent, or Firm—Hamre, Schumann, Mueller & Larson, P.C

(57) ABSTRACT

A vehicle bumper device is equipped with an energy absorption shaft that is provided at a rear portion of a bumper and protrudes the bumper toward a front of a vehicle; and a protrusion mechanism that is provided at the rear portion of the bumper and protrudes the bumper toward the front of the vehicle, wherein the protrusion mechanism is composed of a ball screw operated by a motor driving force, and the ball screw is arranged in parallel to the energy absorption shaft.

4 Claims, 4 Drawing Sheets

Non Collision : Normal State

Collision Prediction Actuation : Before-Collision State

VEHICLE BUMPER DEVICE

BACKGROUND OF THE INVENTION

1. Field of the Invention

The present invention relates to a vehicle bumper device of an automobile, a truck, and the like.

2. Description of the Related Art

Conventionally, in a large vehicle is known a vehicle bump-from-behind buffer device, which is characterized in that with preparing for a bump-from-behind of a following vehicle (car and the like), a rear bumper of the large vehicle is supported so as to be movable forward/backward and a hydraulic buffer for absorption of collision energy for energizing the rear bumper toward a rear of the large vehicle and an actuator for variably regulating a position of the rear bumper, resisting an energizing force of the hydraulic buffer, are provided (see paragraphs 0019 to 0026 and FIGS. 10 and 11 in Japanese Utility Model Patent Laid-Open Publication Hei 5-22216). This is something that makes a rear bumper of a vehicle protrude toward a rear of the vehicle, buffers a shock of a collision by a hydraulic buffer of a hydraulic actuator, and thereby absorbs the shock. At a chassis frame are fixed one ends of two hydraulic actuators and at the other ends are fixed the bumper, thereby a hydraulic pressure is supplied to the hydraulic actuators, hydraulic cylinder rods are extended, and thus the bumper is protruded obliquely downward. Thus, because a plunge-in of a bump-from-behind vehicle can be prevented by protruding the bumper obliquely downward and absorption of collision energy can be achieved by the hydraulic actuators, a shock for a passenger can be alleviated.

On the other hand, in a case of head-on collision of a car that is a bump-from-behind vehicle, the longer a nose length of the vehicle, the longer a crash stroke. Therefore, because a vehicle whose nose length is long can sufficiently achieve the absorption of the collision energy, a shock for a passenger can be alleviated.

However, considering a function such as easy handling of a vehicle turning, a passenger's space, and the like, the shorter the nose length of a vehicle, the easier the handling; and therefore there is a problem of a discrepancy existing for the thought that the nose length is made long in order to improve an absorption property of the collision energy. In addition, with respect to the absorption property of the collision energy, in a case of a collision from a front of the vehicle there is a problem that if such the hydraulic actuators are built in the vehicle, they remain without being crashed at the time of a collision and thereby become a dead space. Furthermore, in a case of collision of a vehicle from an oblique front there is also a problem that rods of hydraulic actuators of a hydraulic buffer break and thereby the absorption property is not sufficiently ensured.

Consequently, in order to solve such the problems is strongly requested a vehicle bumper device that is arranged at a place where crashed remains of an hydraulic actuator do not become a dead space even at the time of a collision from any of front and rear of a vehicle, wherein a rod of the hydraulic actuator is difficult to break and the absorption property of the collision energy and reliability of the vehicle bumper device are high.

SUMMARY OF THE INVENTION

In order to solve the problems described above, a first aspect of the present invention is a vehicle bumper device that comprises an energy absorption shaft and a protrusion mechanism, which are provided at a rear portion of a bumper so as to protrude forward at the time of a collision prediction, wherein the protrusion mechanism comprises a ball screw moved by a motor driving force and the ball screw is arranged in parallel to the energy absorption shaft.

In accordance with the first aspect of the present invention the ball screw is arranged in parallel to the energy absorption shaft, thereby the protrusion mechanism becomes simple and compact, and the ball screw can be arranged at a vehicle so as not to become a dead space when the energy absorption shaft is crashed. In addition, because even in a collision from any of front and oblique front of the vehicle the energy absorption shaft is made a shape, where the energy absorption shaft does not break and surely buckles, and can absorb shock energy, the first aspect of the present invention can provide the vehicle bumper device whose reliability is high.

A second aspect of the present invention is the vehicle bumper device of the first aspect, wherein a cover for encircling a circumference of the ball screw comprises a plurality of pipe members.

In accordance with the second aspect of the present invention the plurality of the pipe members for encircling the circumference of the ball screw are provided, thereby any breakage of the energy absorption shaft and a cornice member can be prevented, and a dust prevention property, a waterproofing property, and a rust prevention property can be improved.

A third aspect of the present invention is the vehicle bumper device of the first aspect, wherein the cornice member is inserted in the energy absorption shaft.

In accordance with the third aspect of the present invention the cornice member is inserted in the energy absorption shaft, thereby a variation of a shock load at the time of a collision can be suppressed and shock energy thereat can be easily absorbed.

A fourth aspect of the present invention is the vehicle bumper device of the first aspect, wherein in the energy absorption shaft a cylindrical hole is formed in a front portion thereof and a rear portion thereof is solid.

In accordance with the fourth aspect of the present invention, in the energy absorption shaft the cylindrical hole is formed in the front portion thereof and the rear portion thereof is solid, thereby the energy absorption shaft does not break but buckles and shock energy at the time of a collision can be easily absorbed.

A fifth aspect of the present invention is the vehicle bumper device of the first aspect, wherein the energy absorption shaft is freely slidably supported by bearings and at least one of bearings of the energy absorption shaft is floated by an elastic element.

In accordance with the fifth aspect of the present invention the energy absorption shaft is freely slidably supported by the bearings and at least one of bearings of the energy absorption shaft is floated by the elastic element, thereby a waggle of the energy absorption shaft, a noise, a vibration, and the like at the time of a protrusion of a bumper are suppressed.

BRIEF DESCRIPTION OF THE DRAWINGS

FIG. 3A is a partly exploded plan view showing a state without a bumper protrusion; FIG. 3B is a partly sectioned front view of FIG. 3A.

FIG. 4A is a plan view; FIG. 4B is a front view of FIG. 4A.

DESCRIPTION OF THE PREFERRED EMBODIMENTS

Here will be described an embodiment of the present invention in detail, referring to drawings.

Figure 1:
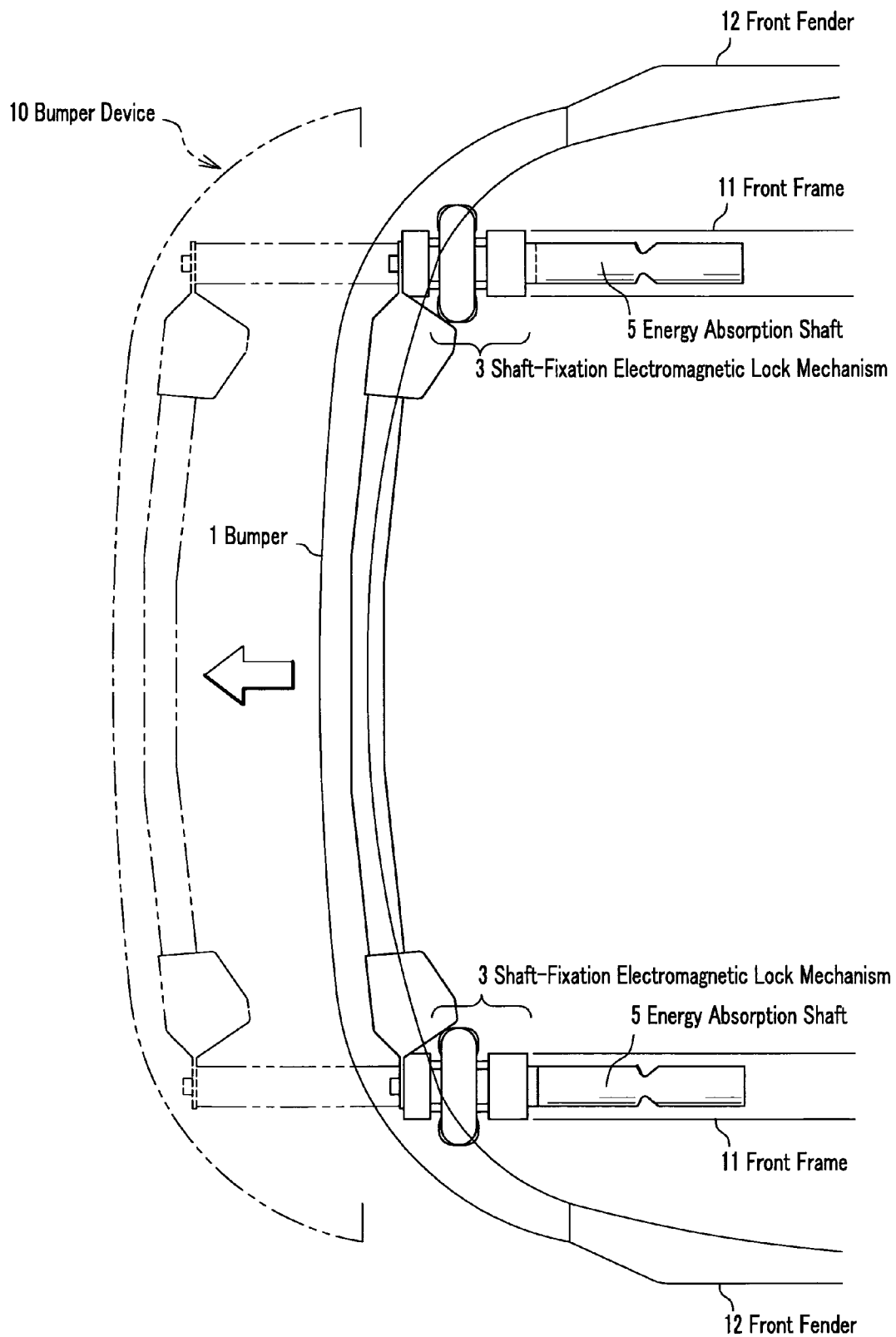
FIG. 1 is a plan view related to a vehicle bumper device related to the present invention.

FIG. 1 is a plan view related to a bumper device 10 of a vehicle (also referred to as vehicle bumper device (10)) related to the present invention. As shown in FIG. 1, shaft-fixation electromagnetic lock mechanisms 3 are respectively provided at left and right ends (up and down ends in FIG. 1) of a front frame 11 that is a front portion of a vehicle body. Each of energy absorption shafts 5 for absorbing energy at the time of a collision is supported by each of the shaft-fixation electromagnetic lock mechanisms 3. A bumper 1 is supported in vicinities of left and right ends thereof by the energy absorption shafts 5. When the energy absorption shafts 5 move forward, the bumper 1 is protruded in a forward direction (arrow mark direction) of the vehicle till a position shown in a chain double-dashed line.

Figure 2:
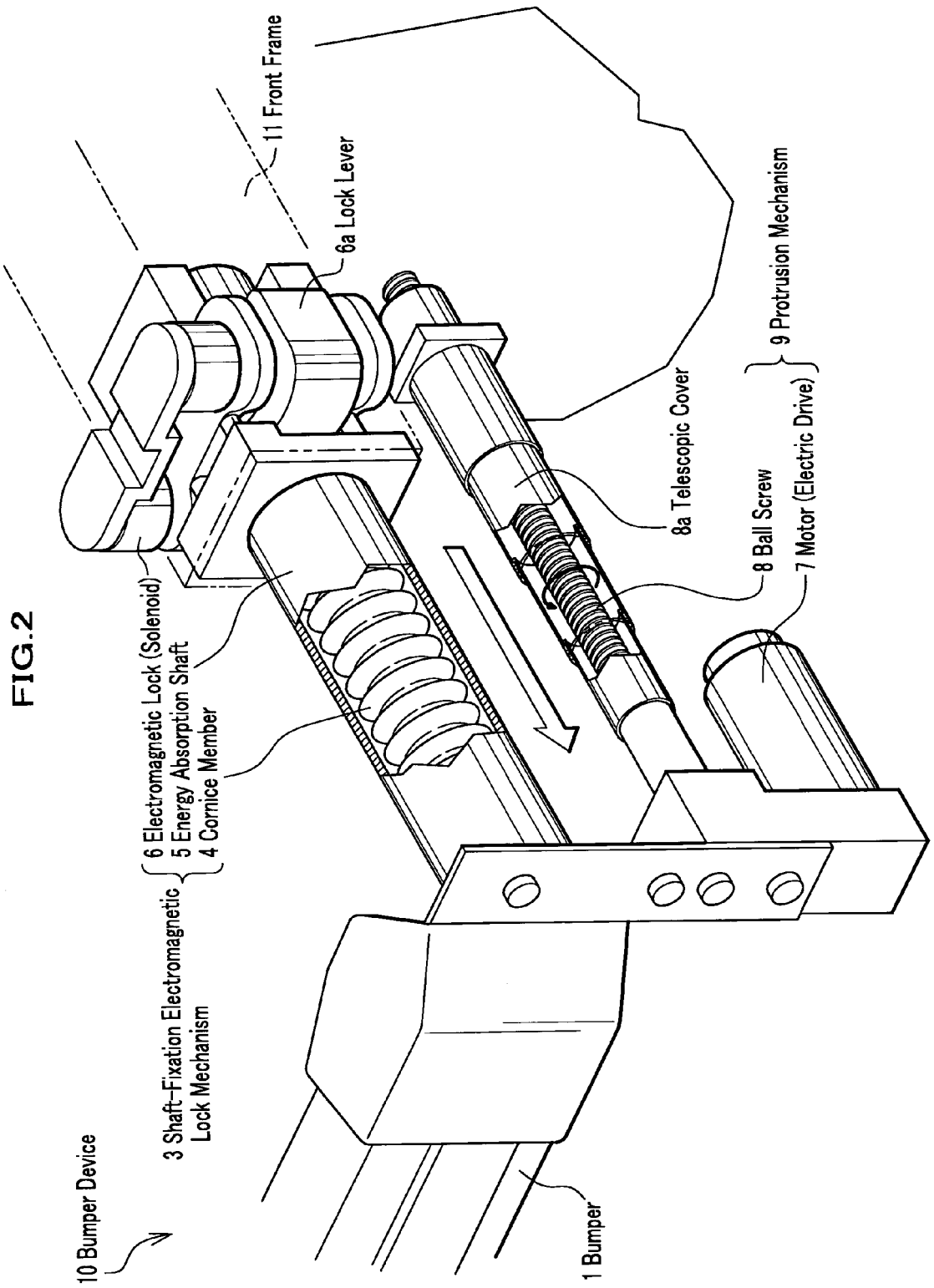
FIG. 2 is a perspective view where one side of the vehicle bumper device related to the present invention is seen from a right near side.

FIG. 2 is a perspective view where one side of the bumper device 10 of a vehicle related to the present invention is seen from a right near side (left side same as right side not shown). As shown in FIG. 2, below a relevant energy absorption shaft 5, a relevant ball screw 8 is provided at the front frame 11 and a motor (electric drive) 7 for rotating the ball screw 8 is arranged at a lower portion of the ball screw 8. In other words, below the energy absorption shaft 5, the ball screw 8 and the motor 7 are arranged in parallel to an axial line of the energy absorption shaft 5, thereby any breakage of the energy absorption shafts 5 and cornice members 4 can be prevented, and thus the bumper device 10 of the vehicle is designed simple and compact.

Figure 3A:
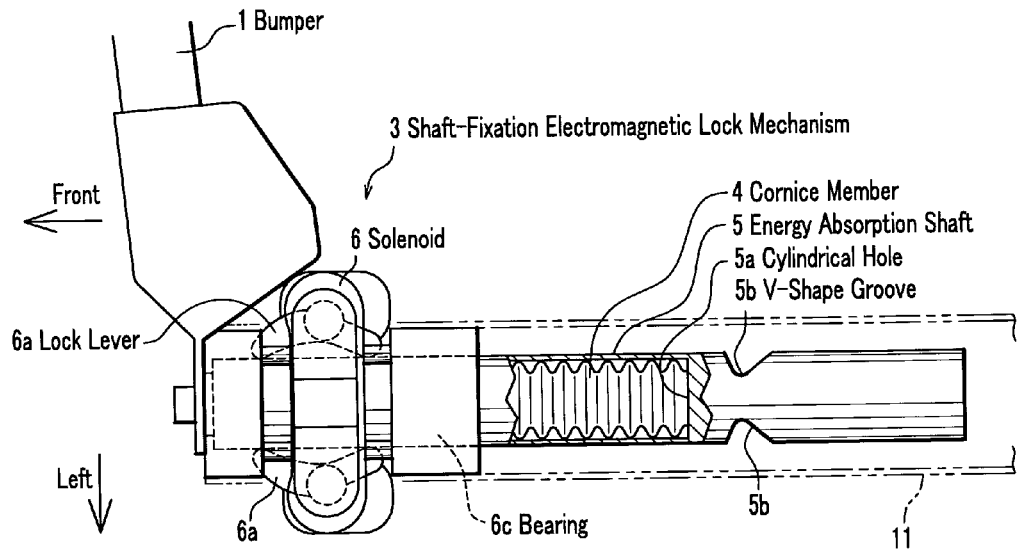
FIGS. 3A and 3B show an initial position of a normal state or returned from a protrusion position in a case of non collision.
Figure 3B:
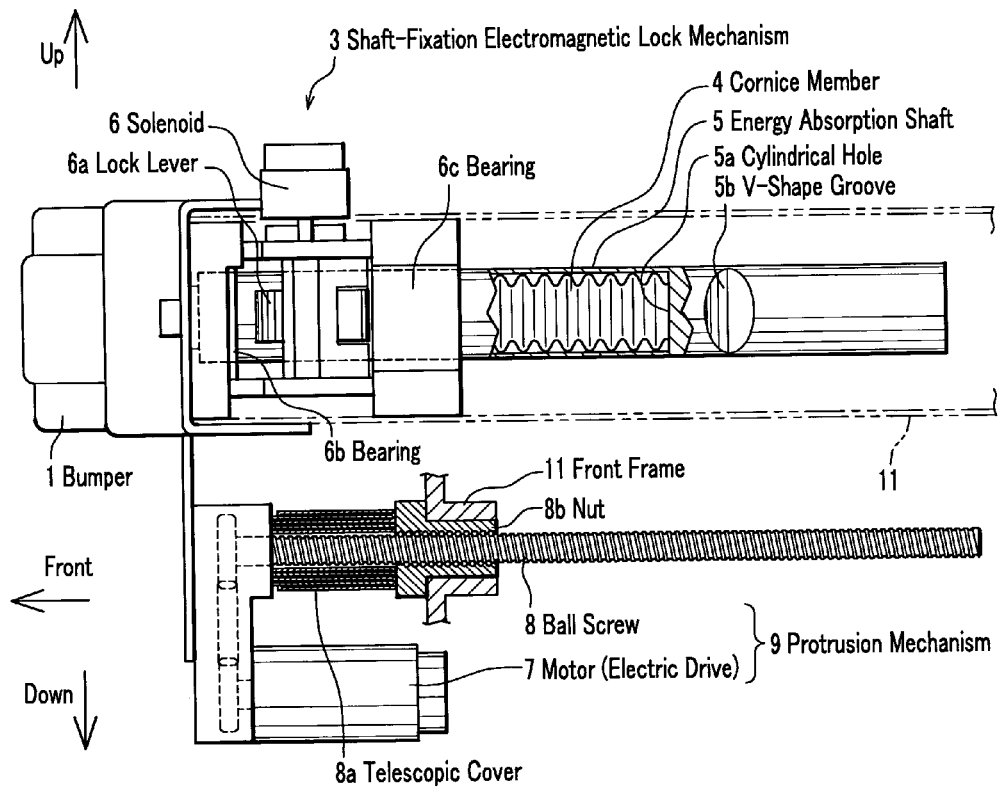

FIGS. 3A and 3B show an initial position of a normal state or returned from a protrusion position in a case of non collision: FIG. 3A is a partly exploded plan view showing a state without a bumper protrusion; FIG. 3B is a partly sectioned front view of FIG. 3A. As shown in FIG. 3B, the bumper 1 is protruded to a front by a rotation of the ball screw 8. The shaft-fixation electromagnetic lock mechanism 3 rotates lock levers 6a and locks the energy absorption shaft 5. Here, the shaft-fixation electromagnetic lock mechanism 3 comprises the energy absorption shaft 5, the cornice member 4 like an accordion inserted inside the energy absorption shaft 5, and a solenoid (electromagnetic lock) 6.

As shown in FIG. 3A, the cornice member 4 is a kind of a spring member formed into an accordion shape or a bellows shape in order to suppress a variation of a shock load and thereby make it easy to absorb collision energy, and is inserted in a cylindrical hole 5a of the energy absorption shaft 5.

The energy absorption shaft 5 is designed to be a pipe form where the large cylindrical hole 5a is formed at a front portion of the energy absorption shaft 5, and the cornice member 4 is inserted in the cylindrical hole 5a. A rear portion of the energy absorption shaft 5 is solid. At the solid portion are formed two opposing V-shape grooves 5b.

The energy absorption shaft 5 is freely slidably supported by two bearings 6b and 6c (see FIG. 3B) supported by the shaft-fixation electromagnetic lock mechanism 3. Furthermore, floating the rear bearing 6c by a rubber bush (elastic element) and the like, a waggle of the energy absorption shaft 5, a noise, a vibration, and the like at the time of a protrusion of the bumper 1 are suppressed.

The solenoid 6 is a mechanism that rotates lock levers 6a, inserts each of the lock levers 6a in each of the V-shape grooves 5b of the energy absorption shaft 5, and fixes the energy absorption shaft 5 by electromagnetic locking.

Still furthermore, as shown in FIG. 3B, below the shaft-fixation electromagnetic lock mechanism 3 is provided a protrusion mechanism 9, which rotates the ball screw 8 by driving the motor (electric drive) 7 and thereby protrudes the bumper 1 from an original housed position. Around the ball screw 8 is provided an expandable/contractible telescopic cover 8a composed of five pieces of various size cylindrical covers, whereby a prevention of shaft breakage of the energy absorption shaft 5 other than the dust prevention property, waterproofing property, and rust prevention property of the ball screw 8 can be improved.

The solenoid (electromagnetic lock) 6 of the shaft-fixation electromagnetic lock mechanism 3 is a magnetic force generator that rotates the lock levers 6a utilizing a magnetic force of a magnet by flowing a current in an electric winding (coil).

Figure 4A:
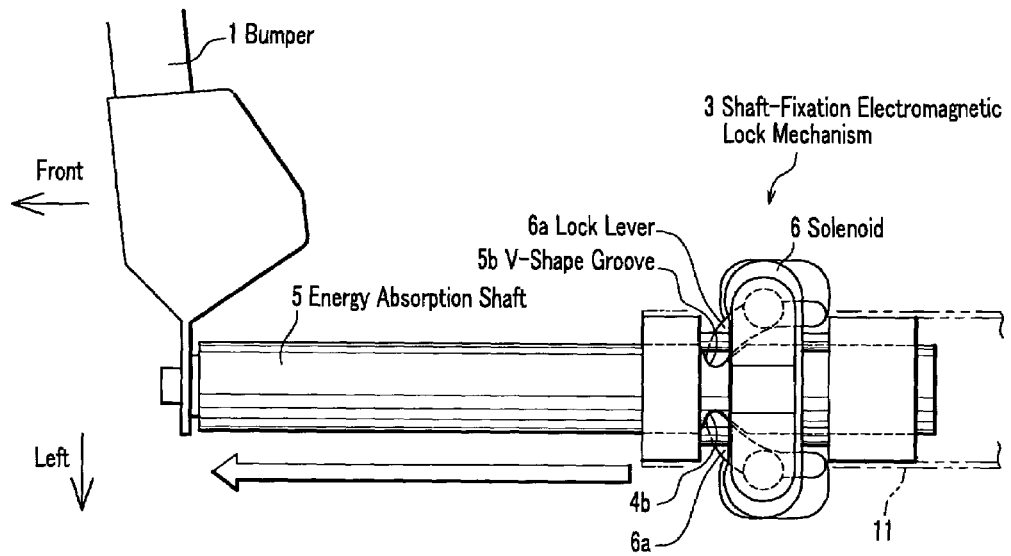
FIGS. 4A and 4B are drawings illustrating an operation of the vehicle bumper device being protruded when a collision prediction is actuated.
Figure 4B:
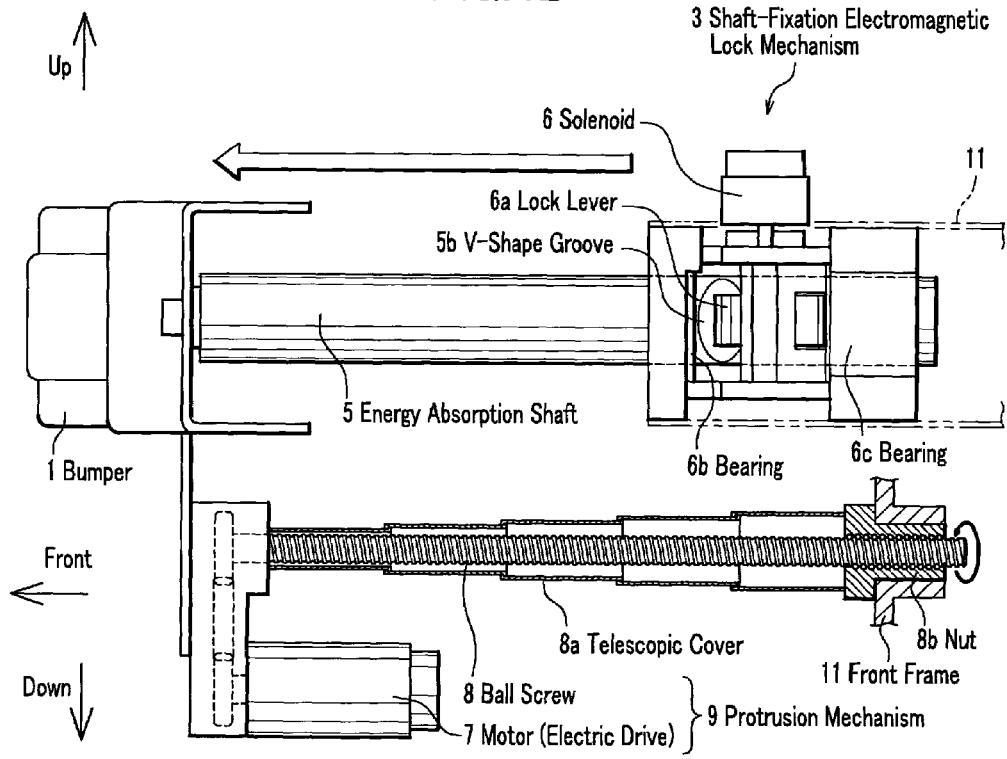

Here will be described an operation of the bumper device 10, referring to FIGS. 4A and 4B. FIGS. 4A and 4B are drawings illustrating an operation of the bumper device 10 being protruded when a collision prediction is actuated: FIG. 4A is a plan view; FIG. 4B is a front view of FIG. 4A. When sensing the collision prediction by a collision prediction sensing element (sensor), the motor 7 instantly rotates, drives the ball screw 8, moves the energy absorption shaft 5 toward the front of the vehicle, and thus protrudes the bumper 1 forward.

When finishing protruding the energy absorption shaft 5, the lock levers 6a of the shaft-fixation electromagnetic lock mechanism 3 rotate. In other words, the solenoid 6 is driven, each of the lock levers 6a are inserted in each of the V-shape grooves 5b of the energy absorption shaft 5 and mechanically locked, the energy absorption shaft 5 is fixed, and thus the protrusion of the bumper device 10 is completed.

By the bumper device 10 thus protruded, a crash stroke is ensured long, an absorption energy amount of the vehicle is enlarged, and moreover the energy absorption shaft 5 buckles without breaking by a shock at the time of a collision. The cornice member 4 also suppresses a variation of a shock load, absorbs collision energy, and thereby buckles.

As the result, the collision energy is absorbed by the bucklings of the energy absorption shaft 5 and the cornice member 4, and thereby an alleviation of collision damage can be realized.

In addition, here will be described an operation of a non collision case where a collision is evaded after a prediction actuation.

The electromagnetic mechanism 3 rotates, the mechanical locks of the lock levers 6a are released, the motor 7 reversely rotates and pulls in the ball screw 8, and thus makes the bumper device 10 automatically return to the initial position.

At this time the initial position is detected by an initial position detecting element of a shaft return position, which is a not shown limit switch provided at the shaft-fixation electromagnetic lock mechanism 3, the motor 7 is stopped, the bumper device 10 in a protrusion state is housed in the initial position of the normal state, and thus the return of the bumper device 10 becomes completed.

In addition, when the bumper device 10 is displaced from the initial position due to some causes such as a vibration, a quick braking, and the like at a normal time such as a stoppage and driving, it is designed so that this state is detected by the initial position detecting element and the bumper device 10 is quickly returned to the initial position.

Thus in the embodiment of the present invention following effects can be obtained. Normally a wide passenger's space and in an emergency a sufficient crash stroke can be ensured by the bumper device 10. In other words, it can be made compatible to ensure the wide passenger's space and improve the absorption property of the collision energy.

In addition, building the protrusion mechanism 9 by such the motor 7 and the ball screw 8 in a vehicle, a structure of the bumper device 10 can be made compact, a drive mechanism of the energy absorption shaft 5 becomes simple, and thus a reliability of the bumper device 10 can be improved.

Thus, although one of embodiments of the present invention is described, the invention is not limited to such the embodiment and various variations are available without departing from the spirit and scope of the invention. For example, from necessity of instantly protruding the bumper 1 a thread pitch of the ball screw 8 may be made any of a large lead and multithreads. In addition, although as shown in FIG. 3B a motor power transmission mechanism between the motor 7 and ball screw 8 of the protrusion mechanism 9 is made a gear, a combination of a pulley and a belt is also available. In addition, diameters of the gear and the pulley may be changed in order to accelerate and decelerate. Furthermore, stable energy absorption can be achieved by making the motor 7 a servomotor, synchronously controlling the motor 7, and surely protruding the bumper 1.

What is claimed is:

1. A vehicle bumper device comprising:
   an energy absorption shaft that is provided at a rear portion of a bumper and protrudes said bumper toward a front of a vehicle; and
   a protrusion mechanism that is provided at the rear portion of said bumper and protrudes said bumper toward the front of said vehicle,
   wherein said protrusion mechanism comprises a ball screw operated by a motor driving force, and said ball screw is arranged in parallel to said energy absorption shaft, and
   wherein said energy absorption shaft is freely slidably supported by bearings and at least one of said bearings of said energy absorption shaft is floated by an elastic element.

2. A vehicle bumper device according to claim 1, wherein a cover for encircling said ball screw comprises a plurality of pipe members.

3. A vehicle bumper device according to claim 1, wherein a cornice member is inserted in said energy absorption shaft.

4. A vehicle bumper device according to claim 1, wherein in said energy absorption shaft a cylindrical hole is formed in a front portion thereof and a rear portion thereof is solid.

* * * * *